United States Patent [19]
Raab et al.

[11] Patent Number: 4,669,593
[45] Date of Patent: Jun. 2, 1987

[54] CLUTCH DISC FOR A MOTOR VEHICLE FRICTION CLUTCH

[75] Inventors: Harald Raab, Schweinfurt; Hilmar Göbel, Grafenrheinfeld, both of Fed. Rep. of Germany

[73] Assignee: Fichtel & Sachs AG, Schweinfurt, Fed. Rep. of Germany

[21] Appl. No.: 757,651

[22] Filed: Jul. 22, 1985

[30] Foreign Application Priority Data

Jul. 24, 1984 [DE] Fed. Rep. of Germany ....... 3427246

[51] Int. Cl.⁴ .............................................. F16D 13/60
[52] U.S. Cl. .................................................. 192/106.2
[58] Field of Search ............... 192/106.2, 106.1, 70.16, 192/70.17, 70.18; 464/68

[56] References Cited

U.S. PATENT DOCUMENTS

| | | | |
|---|---|---|---|
| 3,414,101 | 12/1968 | Binder et al. | 192/106.2 |
| 3,534,841 | 10/1970 | Schneider et al. | 192/106.2 |
| 4,024,938 | 5/1977 | Maucher | 192/106.2 |
| 4,301,907 | 11/1981 | Carpenter et al. | 192/106.2 |
| 4,440,283 | 4/1984 | Nioloux | 192/106.1 X |
| 4,471,863 | 10/1984 | Lech | 192/70.17 X |
| 4,526,260 | 7/1985 | Schierling | 192/106.1 X |
| 4,562,913 | 1/1986 | Cucinotta et al. | 192/70.17 X |

FOREIGN PATENT DOCUMENTS

| | | |
|---|---|---|
| 1801969 | 11/1970 | Fed. Rep. of Germany . |
| 7205198 | 9/1972 | Fed. Rep. of Germany . |
| 7337305 | 1/1974 | Fed. Rep. of Germany . |

Primary Examiner—George H. Krizmanich
Attorney, Agent, or Firm—Toren McGeady Goldberg

[57] ABSTRACT

The clutch disc comprises for torsional vibration damping a spring system (35) dimensioned for operation under load and a spring system (51, 53) dimensioned for operation in idling. An idle motion device (5, 7) ensures that in the case of relative rotation angles in the idling operation the idling spring system (51, 53) exclusively is effective. In order to avoid jumps in the spring characteristic of the spring systems in the transition from idling operation to under-load operation, the idling spring system (51, 53) comprises at least one spring (53) which is brought into action within the rotation angle range of the idle motion device (5, 7) on approach to the under-load range and increases the spring rating of the idling spring system. Thus clutch and gear noises in this transitional range are avoided.

1 Claim, 3 Drawing Figures

CLUTCH DISC FOR A MOTOR VEHICLE FRICTION CLUTCH

BACKGROUND OF THE INVENTION

The invention relates to a clutch disc for a motor vehicle friction clutch and particularly a clutch disc the friction lining carrier of which is coupled rotationally elastically with a hub of the clutch disc both through a spring system dimensioned for the transmission of an under-load torque and through a spring system dimensioned for the transmission of an idling torque.

Such a clutch disc is known for example from German Patent No. 1,801,969. The friction lining carrier of this clutch disc is rotationally elastically connected with the hub through a torsional vibration damper dimensioned for operation under load. This under-load vibration damper comprises coupling springs which are seated in windows of a hub disc protruding radially from the hub, and side discs arranged axially on both sides of the hub disc. The side discs are connected with the friction lining carrier so that the coupling springs are resiliently stressed on rotation of the side discs in relation to the hub disc. A friction device damps the torsional vibrations.

The hub of the clutch disc comprises an inner hub for coupling with the input shaft of the motor vehicle gearing and an outer hub carrying the hub disc. The outer hub is provided with an internal toothing in which an external toothing of the inner hub engages with play in rotation. In pockets of the external toothing of the inner hub there are seated coupling springs dimensioned for the transmission of the idling torque, which are supported on the internal toothing of the outer hub and damp the torsional vibrations occurring in idling operation, by reason of the inherent friction of the hubs or of an additional friction device.

In the known clutch disc the coupling springs of the two spring systems are seated with slight initial stress in the windows of the side discs or the pockets of the hub respectively. In this way a jump occurs in the spring characteristic of the spring systems in the transition from idling operation to under-load operation, causing clutch noises and gear noises in the operation of the vehicle in the lower torque range in driving at low load.

It is the problem of the invention to improve a clutch disc of the above-explained kind so that such noises are largely suppressed or prevented with low constructional expense.

SUMMARY OF THE INVENTION

The invention is based upon a clutch disc for a motor vehicle friction clutch in which the hub and the friction lining carrier are connected with one another for rotation in relation to one another about a commom axis of rotation. The clutch disc comprises two spring systems with coupling springs arranged in separate torque transmission paths between the friction lining carrier and the hub. The coupling springs of a first of the two spring systems are dimensioned for the transmission of an under-load torque, while second coupling springs of the second spring system are comparatively soft, that is they have a lower spring rating and are dimensioned for the transmission of an idling torque. By the under-load torque there are here and below to be understood torques such as occur in the driving or braking operation of the motor vehicle during starting and during the journey. By the idling torque there are to be understood torques such as are transmitted by the clutch disc with the friction clutch disengaged and/or with the gearing situated in the neutral gear position. In the torque transmission path of the under-load spring system there is arranged an idle motion means which ensures that the under-load spring system becomes effective only after a predetermined relative angle of rotation between friction lining carrier and hub has been exceeded. Within this predetermined relative angle of rotation the idling spring system is exclusively effective.

The improvement in accordance with the invention consists in that the second or idling spring system comprises, in addition to the above-mentioned second coupling springs, third coupling springs which are arranged in a third torque transmission path between the friction lining carrier and the hub and are stressed in the relative rotation of the friction lining carrier and the hub. In the torque transmission path of the third coupling springs a second idle motion means is arranged which renders the third coupling springs ineffective within a second relative rotation angle range which is smaller than the above-mentioned first relative rotation angle range. The second or idling spring system thus comprises two sets of coupling springs each comprising at least one second coupling spring, but preferably several coupling springs. One of the sets is always effective in idling operation while the second set is brought into action on approach to the under-load operating range after the take-up of the idle travel of the second idle motion means and increases the spring rating of the idling spring system. In this manner jumps and undesiredly intense angle of the spring characteristic curve, which can lead to clutch and gear noises, can be avoided.

The third coupling springs of the idling spring system are preferably harder than the other idling or second coupling springs, in order that the transition of the spring characteristic from the idling range to the under-load range may be improved.

The invention can be used both in idling spring systems which are bridged over in operation under load, similarly to the system of German Patent No. 1,801,969, and in idling spring systems which are placed in parallel with the under-load spring system and are effective in the entire under-load range. An example of such a system is known from German Utility Model No. 7,205,198.

It is understood that the under-load spring system and possibly also the idling spring system can be provided with a friction device for the damping of rotational vibrations, and the friction devices generate friction forces dependent in stepped form upon the rotation angle, as described by way of example in German Utility Model No. 7,337,305.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
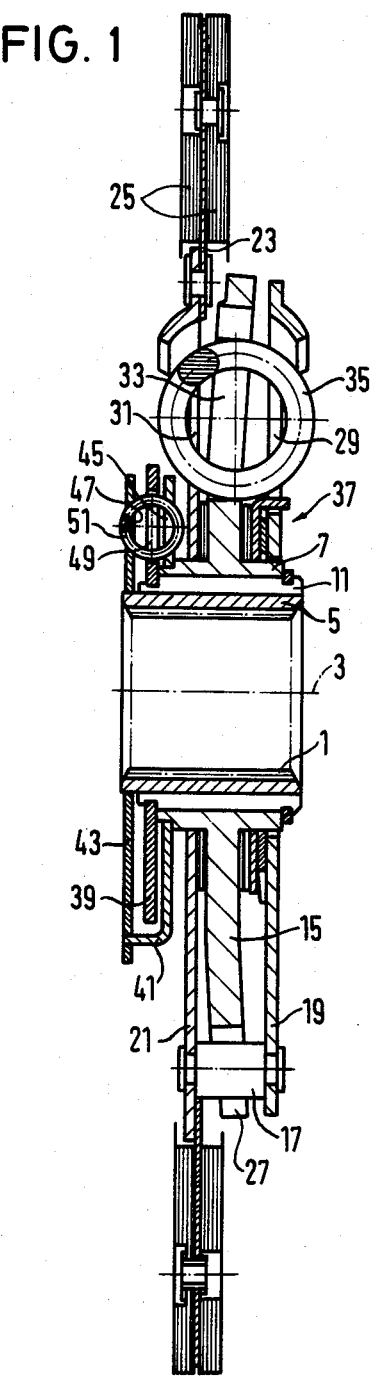
FIG. 1 shows an axial section through a clutch disc for a motor vehicle friction clutch.
Figure 2:
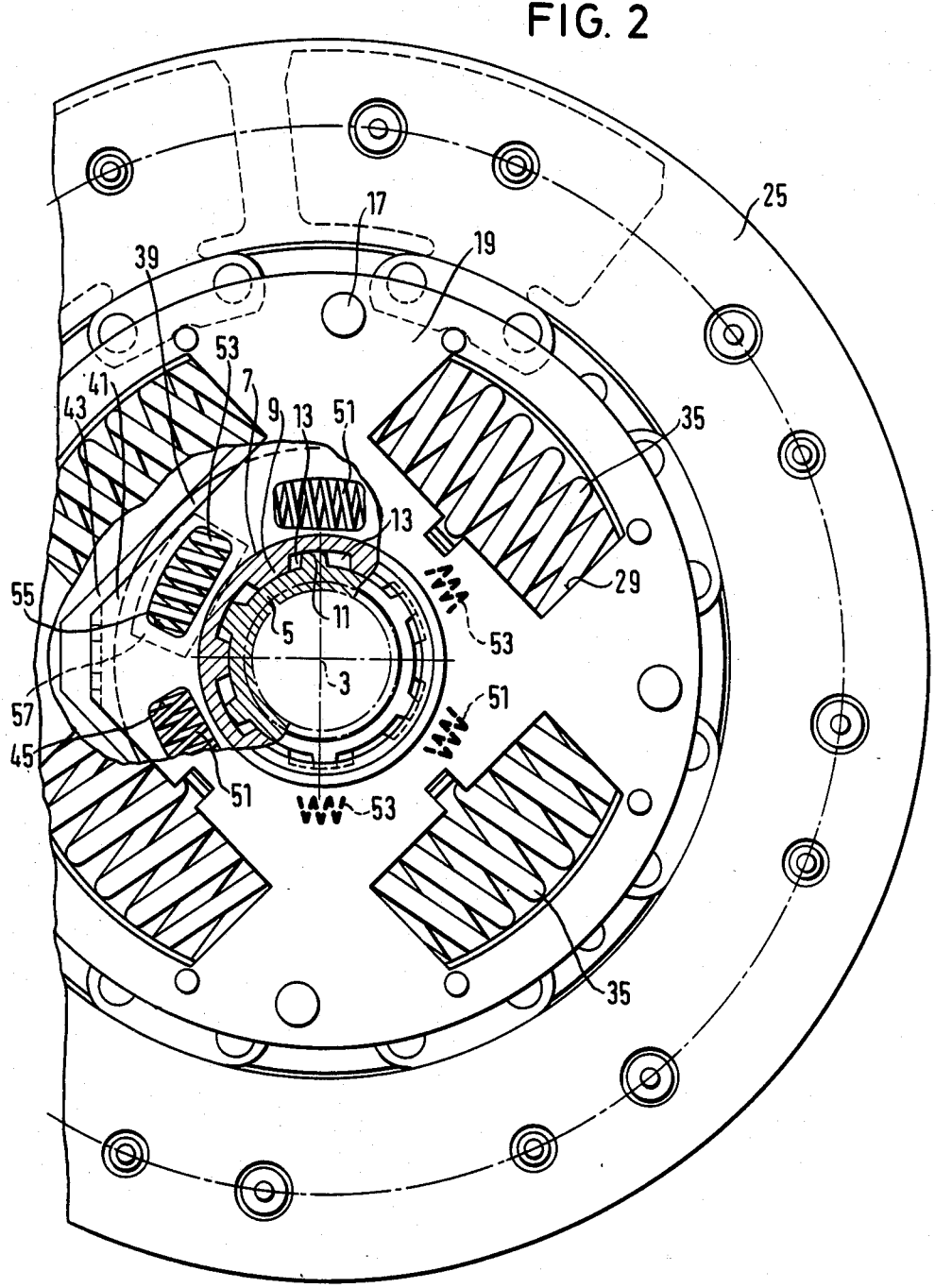
FIG. 2 shows a partially broken away front view of the clutch disc.

The clutch disc as represented in FIGS. 1 and 2 comprises an inner hub 5 for coupling by an internal toothing 1 non-rotatably but axially displaceably with a gear input shaft (not shown) rotatable about a rotation axis 3. The clutch disc further comprises an outer hub 7 arranged coaxially therewith which engages with an internal toothing 9 in an external toothing 11 of the inner hub 5 and is coupled non-rotatably but with play 13 in rotation (FIG. 2) with the inner hub 5. The outer hub 7 carries a substantially radially protruding hub disc 15. Side discs 19, 21 connected by distance rivets 17 into a unit are mounted rotatably on the outer hub 7 axially on both sides of the hub disc 15. A lining carrier ring 23 with clutch friction linings 25 is riveted to the side disc 21. The distance rivets 17 pass through apertures 27 of the hub disc 15 which limit the angle of rotation of the side discs 19, 21 in relation to the outer hub 7.

Several helical compression springs or first coupling springs 35, which are stressed on the relative rotation of the side discs 19, 21 and the hub disc 15, are seated in distribution in the circumferential direction in windows 29, 31 of the side discs 19, 21 for the one part and windows 33 of the hub disc 15 oriented axially in relation thereto for the other part. The first coupling springs are seated in the circumferential direction without play between the stop faces of the windows 29, 31 which face one another in the circumferential direction. At least one of the first coupling springs 35 is moreover seated without play in one of the windows 33 and fixes a rest position of the side discs 19, 21 and thus of the friction linings 25 in relation to the outer hub 7 in the condition of the clutch disc not stressed by a torque. The springs 35 are preferably seated under slight initial stress in the windows 29, 31, in order to prevent them from chattering in operation.

The first coupling springs 35 couple the friction linings 25 rotationally elastically with the outer hub 7 and through the toothings 9, 11 with the inner hub 5. The springs 35 are a component of a torsional vibration damper dimensioned for operation under load, the friction device of which is indicated at 37. The friction device 37 is of conventional construction and may be a multistage device. More particularly, however, control plates or the like controlled friction devices can be provided which are effective exclusively in the underload range of the clutch disc.

The clutch disc further comprises an idling torsional vibration damper which is effective exclusively in idling operation between the inner hub 5 and the outer hub 7. This damper comprises axially laterally of the outer hub 7 a hub disc 39 held non-rotatably on the inner hub 5. Side discs 41, 43 connected non-rotatably with one another and with the outer hub 7 are provided axially on both sides of the hub disc 39. Helical compression springs or second coupling springs 51, which are stressed in the relative rotation of the outer hub 7 and the inner hub 5, are seated without play in the circumferential direction in windows 45, 47 of the side discs 41, 43 for the one part and windows 49 of the hub disc 39 for the other part. The second coupling springs 51 fix the rest position of the outer hub 7 in relation to the inner hub 5 when the clutch disc is unloaded.

The second coupling springs 51 are arranged in distribution in the circumferential direction. Between the springs 51 further helical compression springs or third coupling springs 53 (FIG. 2) are arranged which in conformity with the springs 51 are held in the circumferential direction without play, preferably with slight initial stress, in windows 55 of the side discs 41, 43. The springs 53 however penetrate windows 57 of the hub disc 39 which are larger in the circumferential direction than the windows 55 of the side discs 41, 43. The outer hub 7 can therefore be rotated in an angle range $\alpha_0$ in relation to the inner hub 5, without the third coupling springs 53 for the torque transmission being stressed. In the embodiment as illustrated there are provided three second coupling springs 51 staggered by 120° in relation to one another and three third coupling springs 53 likewise staggered by 120° in relation to one another.

For the damping of the idling torsional vibrations the inherent friction of the clutch disc is frequently sufficient. However, if necessary, an additional friction device dimensioned for the idling torques can also be provided.

The first coupling springs 35 form a first spring system while the second and third coupling springs 51, 53 form a second spring system.

Figure 3:
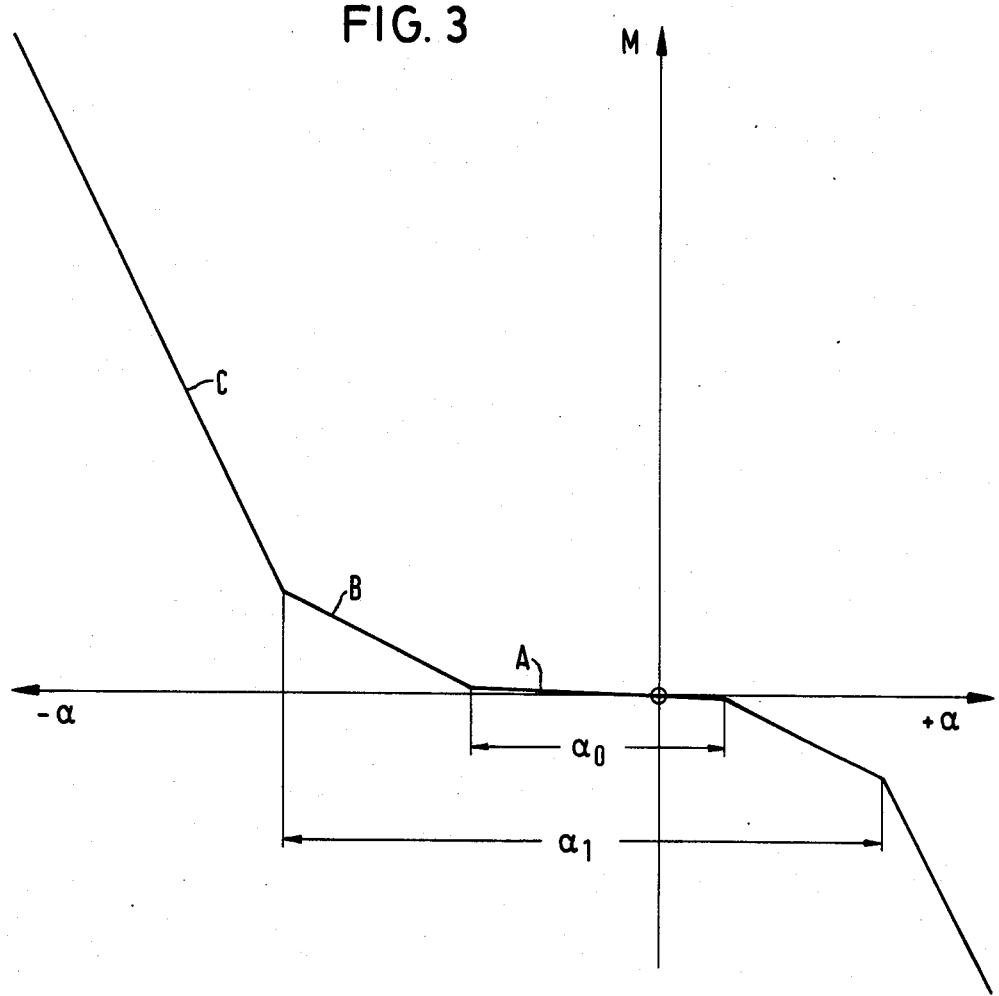
FIG. 3 shows a diagram representing the spring characteristic of the clutch disc, showing the torque M transmitted by the clutch disc, in dependence upon the angle $\alpha$ of relative rotation.

The manner of operation of the clutch disc is to be explained below by reference to FIG. 3. FIG. 3 shows the total spring characteristic of the two spring systems in the form of a diagram of the torque M transmitted by the friction linings 25 to the inner hub 5, in dependence upon the angle of rotation $\alpha$ of the friction linings 25 in relation to the inner hub 5. Starting from the rest position, which the friction linings 25 assume in the absence of torque loading in relation to the inner hub 5, positive values of the angle $\alpha$ designate the thrust loading of the clutch disc by the over-running vehicle, and negative values designate the traction loading by the engine. $\alpha_0$ designates the entire relative angle of rotation in which the second coupling springs 51 of the idling vibration damper are exclusively effective. The spring characteristic of the second coupling springs 51 is designated by A. B designates the spring characteristic of the idling vibration damper which results from the parallel arrangement of the second and third coupling springs 51 and 53, after the third coupling springs 53 have taken up the idle play in the windows 57 of the hub disc 39. $\alpha_1$ designates the entire relative angle of rotation of the idling range which is given by the idle play 13 between the toothings 9, 11 of the inner hub 5 and the outer hub 7. C designates the first coupling spring characteristic of the springs 35 of the under-load vibration damper. The rest position of the clutch disc, fixed by the springs 35 and 51, is arranged eccentrically so that the range of angle of rotation in the traction direction is greater than in the over-run direction.

In the case of small relative angles of rotation in the idling range, the second coupling springs 51 of the idling vibration damper are exclusively effective, since the outer hub 7 can be regarded, by way of the friction unit 37 and the first coupling springs 35, as a rotationally rigid unit for the relatively small torques occurring in idling operation. With increasing relative angle of rotation between the friction linings 25 and the inner hub 5, the third coupling springs 53 are additionally stressed, whereby a higher spring rating of the idling vibration damper results. With further increasing relative angle of rotation the play 13 between the toothings 9, 11 is taken up, whereby the idling vibration damper is bridged over and on further increase of relative angle of rotation the first coupling springs 35 of the under-load vibration damper are stressed exclusively in accordance with the characteristic curve C. The spring characteristic B of the parallel-arranged springs 51, 53 ensures a jump-free gradual transition from the spring characteristic A to the spring characteristic C, whereby clutch and gear noises are avoided in the region of the transition from the idling range to the under-load range. In this connection it has proved expedient if the third coupling springs 53 are harder, that is have a higher spring rating, than the second coupling springs 51.

While specific embodiments of the invention have been shown and described in detail to illustrate the application of the inventive principles, it will be understood that the invention may be embodied otherwise without departing from such principles.

We claim:

1. Clutch disc for a motor vehicle friction clutch, comprising:
   (a) an inner hub (5) having an axis of rotation (3) and provided with a set of external teeth (11) extending in the direction of the axis of rotation,
   (b) an outer hub (7) encircling said inner hub (5) and comprising a set of internal teeth (9) extending in parallel relationship with the external teeth (11) and arranged to engage the external teeth for coupling the outer hub (7) with the inner hub (5) so that the outer hub rotates with the inner hub after a certain amount of rotational play equal to a first rotational angle $\alpha_1$,
   (c) a friction lining carrier (23, 25) rotatable relative to the outer hub (7),
   (d) a first hub disc (15) projecting radially outwardly from said first hub (7), said first hub disc (15) having a plurality of windows (33) therein spaced apart in the circumferential direction around the axis (3) of rotation,
   (e) a first spring system dimensioned for the transmission of an under-load torque and including a plurality of first coupling springs (35) each located in one of said windows (33) of said first hub disc (15) and being stressed during relative rotation between sid fristion lining carrier (23, 25) and said outer hub (7), with at least one of said first coupling springs defining a rest position of the friction lining carrier relative to said outer hub,
   (f) a second hub disc (39) spaced in the direction of the axis (3) of rotation from said outer hub (7) and secured to said inner hub (5) for rotation therewith,
   (g) two side discs (41, 43) spaced apart in the direction of the axis (3) of rotation and each located on an opposite side of said second hub disc (39), said side discs are interconnected for rotation as a unit and are connected with said outer hub (7) for rotation therewith, and
   (h) a second spring system dimensioned for the transmission of an idling torque and including at least one second coupling spring (51) and at least one third coupling spring (53), said at least one second coupling spring (51) arranged in windows (45, 47) of said side discs (41, 43) and in a window (49) of said second hub disc (39), said at at least one third coupling spring (53) arranged in windows (55) of said side discs (41, 43) and in a window (57) of said second hub disc (39) and said second and third coupling springs (51, 53) being stressed during relative rotation of said inner and outer hubs (5, 7), said second and third coupling springs (51, 53) are spaced apart in the circumferential direction around the axis (3) of rotation, said at least one second coupling spring (51) extends in the circumferential direction about said axis of rotation and is free of any play in the circumferential direction about the axis of rotation within the windows (45, 47) of said side discs (41, 43) and the window (49) of said second hub disc (39) and said at least one second coupling spring defines the rest position of said outer hub (7) relative to said inner hub (5), said at least one third coupling spring (53) extends in the circumferential direction of the axis of rotation and there is a certain amount of play in the circumferential direction of the axis of rotation between said at least one third coupling spring (53) and one of said windows (55) of said side discs and said window (57) of said second hub disc and the amount of play is equal to a second rotational angle ($\alpha_0$) between said outer hub (7) and said inner hub (5) and said second angle ($\alpha_0$) is smaller than said first angle ($\alpha_1$).

* * * * *